United States Patent [19]
Ihara et al.

[11] Patent Number: 5,209,936
[45] Date of Patent: May 11, 1993

[54] INJECTION MOLDING MACHINE HAVING A LOAD CELL FOR DETECTING A PRESSURE APPLIED TO A SCREW COUPLING

[75] Inventors: Hirokazu Ihara; Yukihiko Nakamura, both of Nagano, Japan

[73] Assignee: Nissei Jushi Kogyo K.K., Nagano, Japan

[21] Appl. No.: 731,247

[22] Filed: Jul. 17, 1991

[30] Foreign Application Priority Data

Jul. 18, 1990 [JP] Japan .................................. 2-190105

[51] Int. Cl.⁵ ............................................ B29C 45/77
[52] U.S. Cl. ................................ 425/149; 264/40.3; 425/170
[58] Field of Search ............ 425/145, 149, 170, 450.1, 425/451.9, 589, 590, 595; 264/40.3, 40.1

[56] References Cited

U.S. PATENT DOCUMENTS

| 4,718,840 | 1/1988 | Inaba et al. | 425/149 |
| 4,758,391 | 7/1988 | Smimizu et al. | 425/149 |
| 4,961,696 | 10/1990 | Yamamura | 425/149 |

*Primary Examiner*—Tim Heitbrink
*Attorney, Agent, or Firm*—Sughrue, Mion, Zinn, Macpeak & Seas

[57] ABSTRACT

An injection molding machine including a guide coupling for transmitting linear movement to a screw, a screw coupling for transmitting a rotary movement to the screw, a washer-type load cell, disposed between the guide coupling and the screw coupling, for detecting a pressure applied to the screw coupling, and a transmission link having one end thereof coupled to the screw coupling so as to be rotatable relative thereto and axially fixed relative there. The transmission link rotationally fixed relative to the guide coupling.

15 Claims, 3 Drawing Sheets

INJECTION MOLDING MACHINE HAVING A LOAD CELL FOR DETECTING A PRESSURE APPLIED TO A SCREW COUPLING

FIELD OF THE INVENTION

The present invention relates to an injection molding machine having a built-in load cell for detecting a pressure applied to a screw.

BACKGROUND OF THE INVENTION

Generally, electrically driven injection molding machines have a built-in load cell located inside a screw drive mechanism to detect a pressure to be applied to a screw.

FIGS. 3 and 4 show a known injection molding machine having such a built-in load cell.

As shown in FIG. 3 an injection molding machine 60 includes a guide coupling 53 which is slidably supported by a plurality of guide shafts 51 and to which linear movements from a ball screw mechanism 52 is transmitted. The machine 60 also includes a screw coupling 54 which is coupled to a rear end of a screw 55 and to which rotary movements are transmitted. The screw coupling 54 is rotatably supported by the guide coupling 53. In addition, a washer type load cell (pressure detector), which comprises an inner tubular portion 62, an outer tubular portion 63, and an intermediate distorting portion 64, is interposed between the screw coupling 54 and the guide coupling 53. The load cell 61 and the guide coupling 53 are secured to the screw coupling 54 by a bearing nut 56, together with a thrust bearing 58 and an angular ball bearing 59. Both of the bearings 58 and 59 interpose the load cell and the guide coupling 53 therebetween.

As a result, once a pressure from the screw 55 is provided to the inner tubular portion 62 through the screw coupling 54 and the thrust bearing 58, the intermediate distorting portion 64 generates a distortion which corresponds to the applied pressure because the outer tubular portion 63 is regulated by the guide coupling 53. This pressure is detected by distortion gages mounted on the intermediate distorting portion 64.

However, in the injection molding machine 60, a torque of the bearing nut 56 acts on the outer tubular portion 63 through the intermediate distorting portion 64. As a result of this torque, an initial distortion is generated at the load cell 61, thereby causing the bearing height of the thrust bearing 58 and the thickness of the load cell 61 to be decreased as the injection force increases. As a result, a pre-load to the angular ball bearing 59 is decreased in proportion to such decrease, thereby impairing linearity in the detection characteristic (output characteristic) of the load cell 61 in accordance with the magnitude of the injection force. This leads to incorrect pressure detections, making their corrections difficult. In addition, deviations from the zero point are caused not only by reversible variations in the pre-load due to secular changes derived from factors such as temperature variations and different thermal expansion coefficients among materials, but also by irreversible variations in the pre-load caused by the slackening of the bearing nut 56 due to repeated use. Such deviations bring about a reduction in detection accuracy, reliability, and the like.

FIG. 4 shows an injection molding machine 70 in which the above described shortcomings are overcome. The injection molding machine 70 shown in FIG. 4 is disclosed in Japanese Patent Unexamined Publication No. 27921/1989 and is constructed in such a manner that the load cell 61 is interposed between the guide coupling 53 and a ball nut 57 of the ball screw mechanism 52. With this construction, the influence from the pre-load applied from the bearing nut 56 is eliminated.

Although the injection molding machine 70 is free from the influence from the pre-load, it is affected by the frictional resistance of the guide coupling 53 and the like. That is, although the guide coupling 53 is slidably supported by the guide shafts 51, there exists not only certain friction but also error factors attributal to the guide shafts 51, i.e., variable error factors such as their thermal expansion and fixed error factors such as their machining accuracy and their parallelism during assembling. Consequently, the magnitude of friction varies in accordance with the position of the guide coupling 53 and the time which has elapsed from the start of operation. As a result, the injection molding machine 70, like other known machines, is not free from impairment in detection accuracy. Further, the installation of the load cell 61 outside of the guide coupling 53 requires a mounting screw hole, thereby leading to the disadvantage that the load cell 61 is large in structure. The elements and components in FIG. 4 which are the same as in FIG. 3 are designated by the same reference numerals so that its construction can be clearly viewed relative to FIG. 4.

SUMMARY OF THE INVENTION

It is therefore an object of the invention to overcome the problems associated with the conventional art. Accordingly, an object of the invention is to provide an injection molding machine which is capable of accurately detecting pressures while not being affected by the pre-load due to the bearing nut nor by effects of the guide coupling.

The present invention accomplishes these and other objects by providing an injection molding machine including: a guide coupling for transmitting a linear movement; a screw coupling for transmitting a rotary movement; and a washer type load cell which has an inner tubular portion, an outer tubular portion, and an intermediate distorting portion, and which is disposed between the guide coupling and the screw coupling to detect pressure applied to the screw coupling. The guide coupling rotatably supports the screw coupling. As a feature in constructing the machine, one end portion of a transmission link is attached to the screw coupling so as to be rotatably and axially position-regulated through bearing portions. The transmission link is position-regulated in the direction of rotation relative to the guide coupling, and the load cell is interposed between the other end portion of the transmission link and the guide coupling. The one end portion and the pair of bearing portions interposing the one end portion therebetween are secured to the screw coupling by a bearing nut.

According to the injection molding machine of the invention, the pair of bearing portions and the one end portion of the transmission link are secured to the screw coupling by the bearing nut, and the bearing portions are provided with predetermined pre-loads. In this case, the pre-loads, act only so as to clamp the one end portion of the transmission link, and do not affect the pressure detection of load cell.

Further, since the transmission link is position-regulated only in the direction of rotation relative to the guide coupling, and the load cell is interposed between the other end portion of the transmission link and the guide coupling, the pressure from the screw is applied to the other tubular portion of the load cell through the screw coupling, the bearing portion, and the transmission link without acting on the guide coupling.

As a result, the pressure from the screw is applied to the outer tubular portion, while the inner tubular portion is position-regulated by the guide coupling. This causes a distortion corresponding to the pressure to be generated at the intermediate distorting portion, and the generated distortion is detected by the distortion gages mounted on the intermediate distortion portion. The output of the distortion gages, being unaffected by the presence of the pre-loads or by the guide coupling, is directly proportional to the pressure from the screw.

DETAILED DESCRIPTION OF THE PREFERRED EMBODIMENTS

An embodiment of the invention will now be described in detail with reference to FIGS. 1-2.

Figure 2:
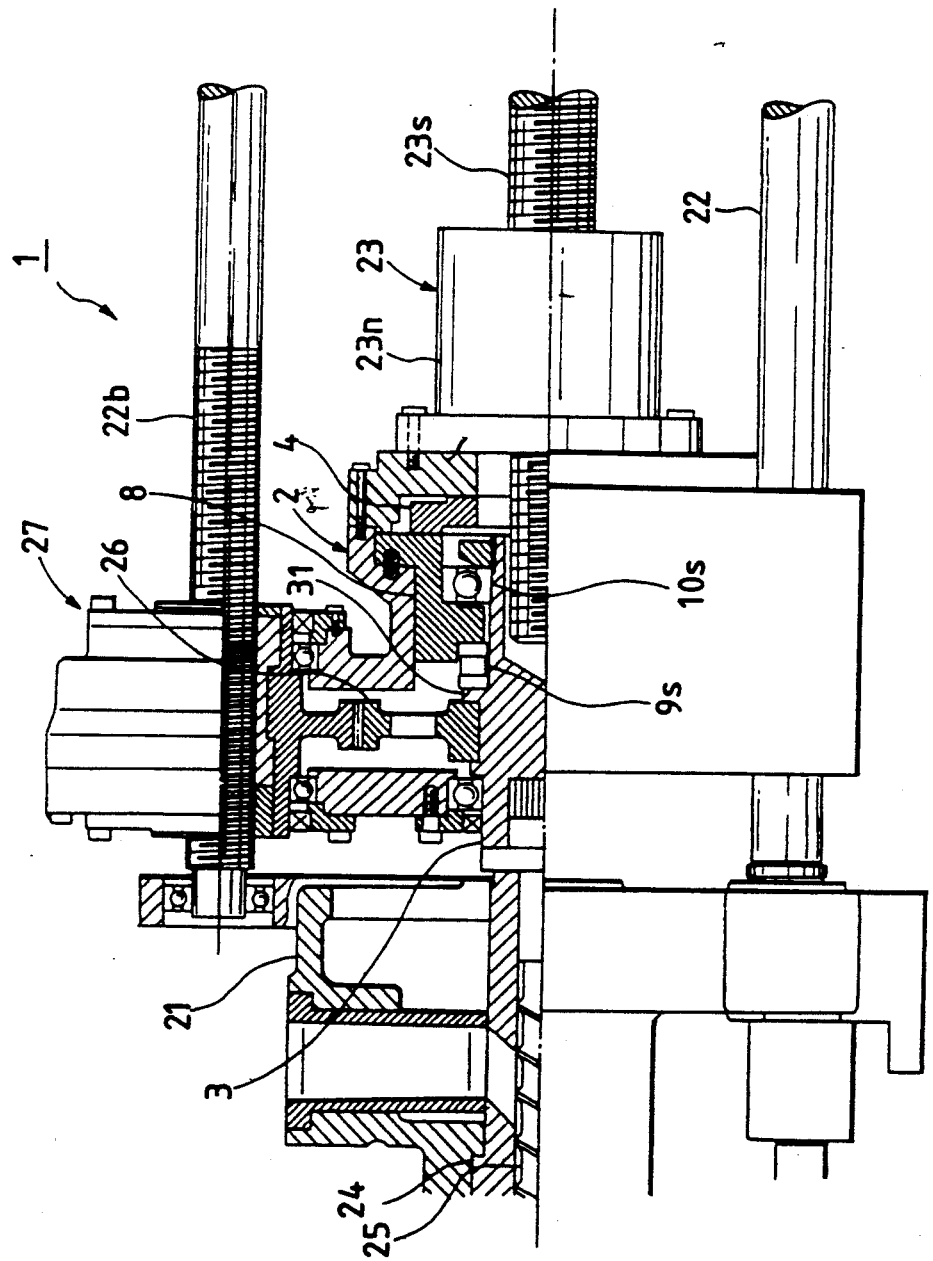
FIG. 2 is another sectional side view of the injection molding machine of the invention.
Figure 3:
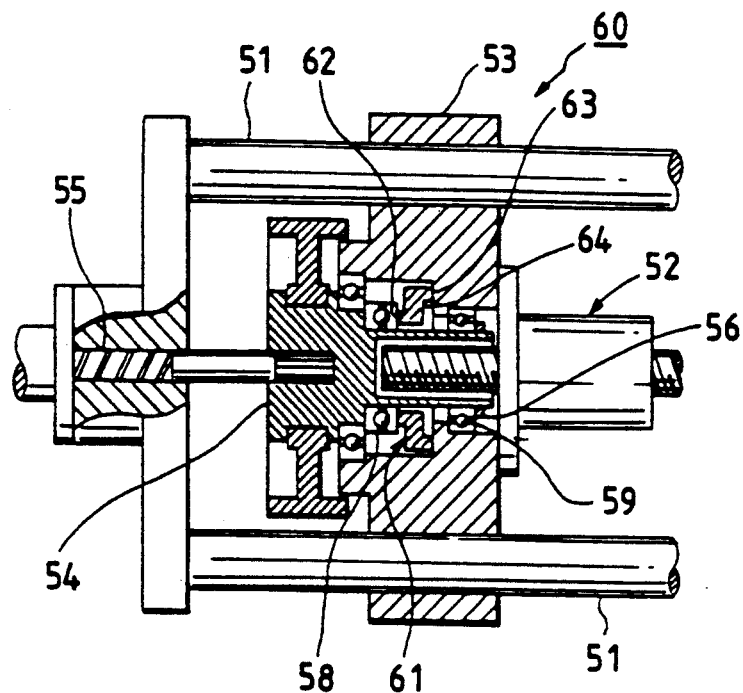
FIGS. 3 and 4 are sectional side views showing known injection molding machines.
Figure 4:
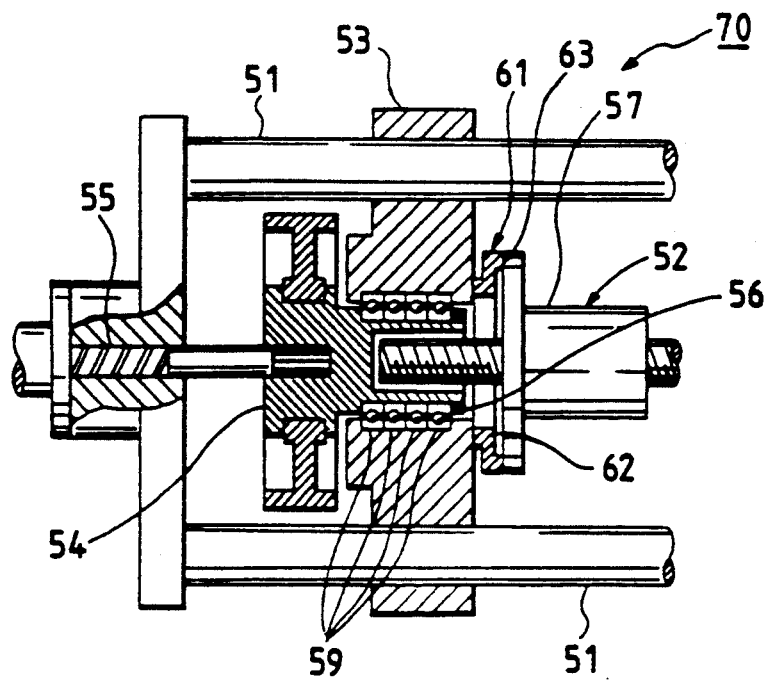

As shown in FIG. 2, the injection molding machine 1 includes a plurality of guide shafts 22 whose front ends are supported by an injection stand 21. A guide coupling 2 is slidably supported by the guide shafts 22 and regulated in the direction of rotation. A ball nut 23n of a ball screw mechanism 23 is coupled to the guide coupling 2, while a servo motor (not shown) is coupled to a ball screw 23s and, as a result, linear movements for injection are transmitted to the guide coupling 2.

The injection stand 21 includes a heated tube 24 and a screw 25 which is inserted into the heated tube 24. The rear end of the screw 25 is coupled to the screw coupling 3. The screw coupling 3 has a transmission gear 26, so that rotary movements for measurement are transmitted to the screw coupling 3 through the transmission gear 26. In this embodiment a transmission mechanism 27 including a ball spline 22b for transmitting rotation to the transmission gear 26 is shown.

Figure 1:
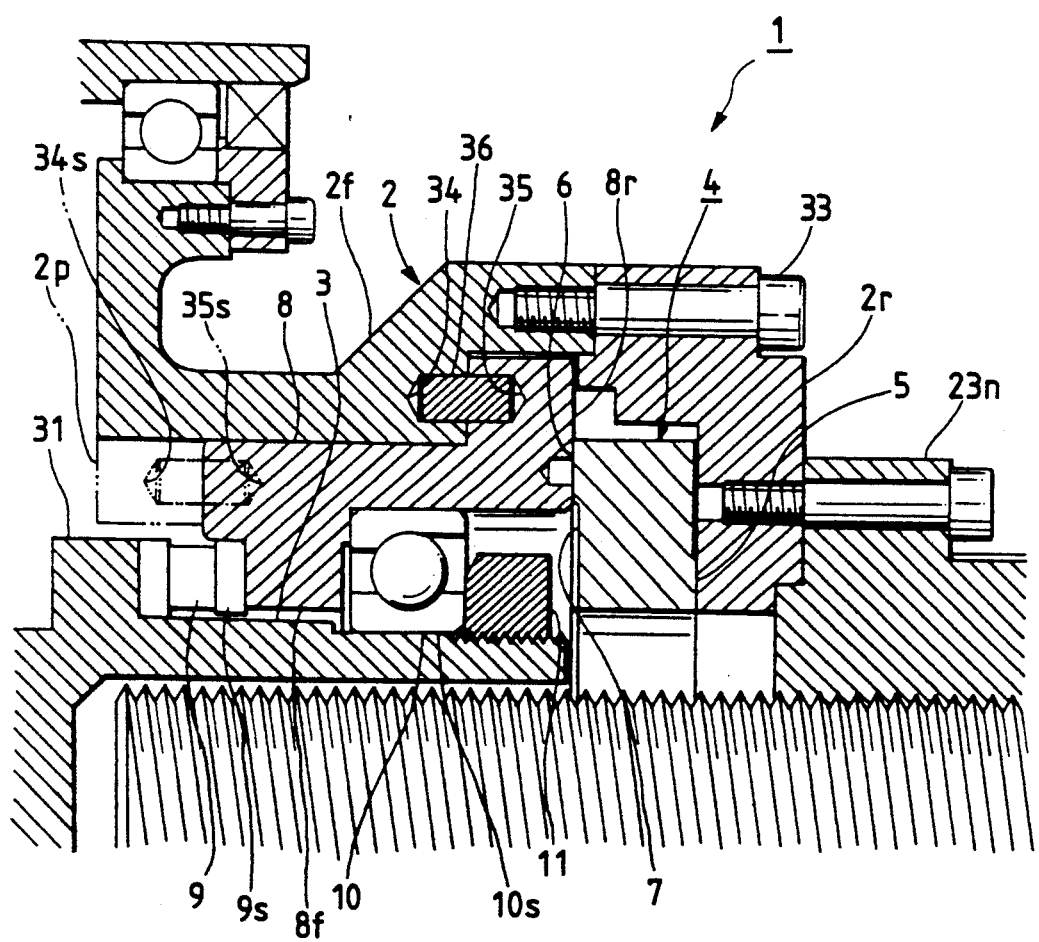
FIG. 1 is a sectional side view showing the injection molding machine according to the invention.

Referring now to FIG. 1, a radially outwardly protruding stopper 31 is arranged in the middle of the outer peripheral portion of the screw coupling 3. Located behind the stopper 31 are a thrust bearing 9s comprising one bearing portion 9, one end portion 8f of a transmission link 8, and an angular ball bearing 10s constituting the other bearing portion 10, and these components are secured to the screw coupling 3 by a bearing nut 11 which is screwed to the rear portion of the screw coupling 3. The transmission link 8 is formed so as to be tube-like, and the one end portion 8f interposed between the bearings 9s, 10s is formed so as to be flange-like by causing its inner peripheral surface to protrude inwardly in the radial direction at a position closer to its axially extending end (front end). The housing washer portion of the angular ball bearings 10s is abuts against the one end portion 8f of the transmission link 8 and the bearing nut 11 is abuts against the shaft washer portion of the bearing 10s.

The other end portion 8r of the transmission link 8 is formed so as to be flange-like i.e., to protrude outwardly in the radial direction at its other axially extending end (rear end). Further, the guide coupling 2 consists of a front coupling 2f and a rear coupling 2r, with both couplings 2f, 2r being integrally coupled by bolts 33. Axially extending regulating holes 34, 35 are arranged at predetermined positions on the front coupling 2f and on the corresponding surface of the other end portion 8r, with both ends of a regulating pin 36 being inserted into the regulating holes 34, 35. As a result, the transmission link 8 is position-regulated in the direction of rotation relative to the guide coupling 2 and its displacement in the axial direction is allowed.

Further, a load cell 4 (pressure detector) is disposed in a space between the other end portion 8r of the transmission link 8 and the rear coupling 2r. The load cell 4 includes the inner tubular portion 5 and the outer tubular portion 6, both portions being comparatively thick and stepped relative to each other, and an intermediate distorting portion 7 which is relatively thin and which is interposed between the inner tubular portion 5 and the outer tubular portion 6, with all these components being formed integrally into a washer type unit. In the intermediate distorting portion 7 are a plurality of distortion gages. The inner tubular portion 5 of the load cell 4 abuts against the rear coupling 2r and its outer tubular portion 6 abuts against the other end portion 8r of the transmission link 8.

The space between the other end portion 8r and the rear coupling 2r at which the load cell 4 is interposed is adjusted so that no pre-load will be applied to the load cell 4 by interposing a shim plate (spacer) therebetween at the time the front coupling 2f and the rear coupling 2r are being coupled. The division of the guide coupling 2 into the front and rear portions facilitates not only adjustment in installing the load cell, but also assembly of the mechanical parts.

The functions of the respective parts will now be described.

When the bearing nut 11 is tightened, a predetermined pre-load is applied to the bearings 9s, 10s and the one end portion 8f of the transmission link 8 is rotatably fixed to the screw coupling 3. With this construction, the pre-load does not affect the load cell 4 which detects pressures.

Further, the transmission link 8 is position-regulated only in the direction of rotation relative to the guide coupling 2 and the load cell 4 is interposed between the other end portion 8r of the transmission link 8 and the guide coupling 2, so that the pressure from the screw 25 is applied to the outer tubular portion 6 of the load cell 4 through the screw coupling 3, the bearing portion 9, and the transmission link 8, without affecting the guide coupling 2.

As a result, the pressure from the screw 25 is applied to the outer tubular portion 6, while the inner tubular portion 5 is position-regulated by the guide coupling 2. This causes a distortion corresponding to the pressure to be generated at the intermediate distortion portion 7, and the generated distortion is detected by the distortion gages mounted on the intermediate distorting portion 7. As a result, the output of the distortion gages, which are unaffected by the presence of the pre-loads or by the guide coupling 2, is directly proportional to the pressure from the screw.

While the present invention has been described in detail above according to an embodiment, the invention is not limited to such an embodiment. For example, the injection molding machine of the invention may be arranged so that an extending portion 2p is provided at a position closer to the front end of the front coupling 2f, as shown by a phantom line in FIG. 1, and so that the regulating pin 36 and the regulating holes 34, 35 are positioned between the extending portion 2p and the transmission link 8. The regulating holes in this case are shown by reference numerals 34s, 35s.

As described above, the injection molding machine of the invention is rotatably installed to the screw coupling while position-regulating the one end of the transmission link in the axial direction through the bearing portion, the transmission link is position-regulated in the direction of rotation relative to the guide coupling, and the load cell is interposed between the other end of the transmission link and the guide coupling. As a result of this construction, the following advantages are obtained. Since neither the pre-loads applied by the tightening of the bearing nut nor the guide coupling affects the operation of detecting pressures, the detection accuracy and reliability of the machine are improved.

Since neither highly accurate management of pre-loads nor highly accurate machining and assembling of the guide coupling, the injection stand, the injection drive stand, the guide shaft, and the like are required, the fabrication and assembly of the machine are easy.

We claim:

1. An injection molding machine comprising:
   a guide coupling for transmitting a linear movement to an injection screw;
   a screw coupling for transmitting a rotary movement to said injection screw;
   a load cell, disposed between said guide coupling and said screw coupling, for detecting a pressure applied to said screw coupling; and
   a transmission link having a first end thereof coupled to said screw coupling so as to be rotatable relative to said screw coupling and axially fixed relative to said screw coupling,
   said transmission link being rotationally fixed relative to said guide coupling and axially slidable relative to said guide coupling.

2. The injection molding machine as defined in claim 1, wherein said load cell includes an inner tubular portion, an outer tubular portion, and an intermediate distorting portion disposed between said inner and outer tubular portions.

3. The injection molding machine as defined in claim 1, further comprising a pair of bearings, said first end of said transmission link being disposed between said pair of bearings.

4. The injection molding machine as defined in claim 3, further comprising a bearing nut, said first end of said transmission link and said pair of bearings being secured to said screw coupling by said bearing nut.

5. The injection molding machine as defined in claim 1, wherein said load cell is disposed between a second end of said transmission link and said guide coupling.

6. The injection molding machine as defined in claim 4, wherein each of said bearings have a predetermined pre-load so as to clamp said first end of said transmission link.

7. The injection molding machine as defined in claim 1, further comprising a plurality of guide shafts, and an injection stand, front ends of said guide shafts being supported by said injection stand.

8. The injection molding machine as defined in claim 7, wherein said guide coupling is slidably supported by said guide shafts.

9. The injection molding machine as defined in claim 7, wherein said injection stand includes a tube, said injection screw being disposed in said tube, a rear end of said injection screw being coupled to said screw coupling.

10. The injection molding machine as defined in claim 1, wherein said screw coupling includes a transmission gear for transmitting rotary movements to said injection screw.

11. The injection molding machine as defined in claim 2, wherein said inner tubular portion and said outer tubular portion are stepped relative to each other.

12. The injection molding machine as defined in claim 2, wherein said inner tubular, outer tubular and intermediate portions are integrally formed.

13. The injection molding machine as defined in claim 1, wherein said guide coupling comprises a front coupling and a rear coupling.

14. The injection molding machine as defined in claim 13, further comprising bolts for coupling said front and rear couplings together.

15. The injection molding machine as defined in claim 13, wherein said load cell is disposed in a space located between said rear coupling and said first end of said transmission link.

* * * * *